July 2, 1935.   H. C. RIESINGER   2,006,653
TAMPERPROOF TRANSMISSION EQUIPMENT
Filed Sept. 8, 1931   2 Sheets-Sheet 2
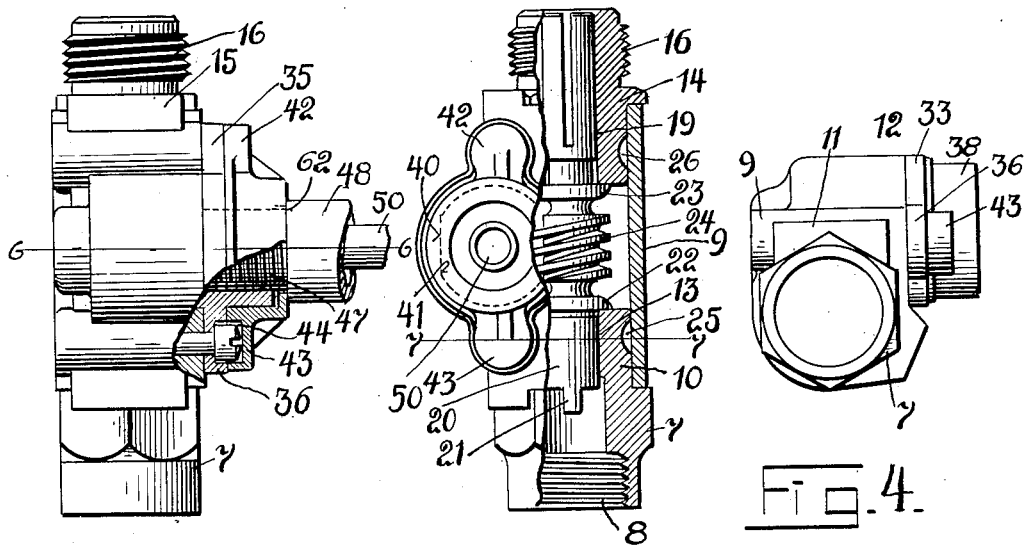
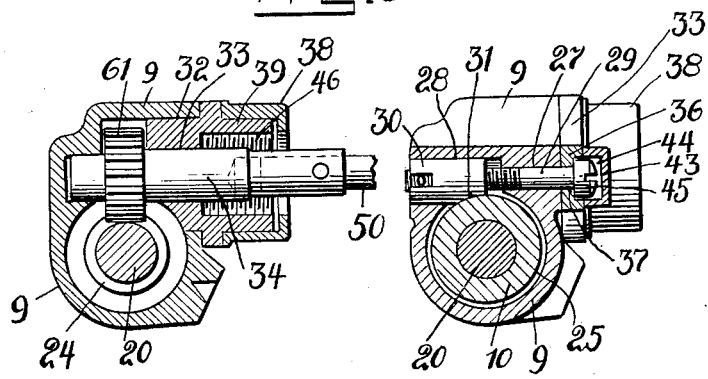
INVENTOR
Herbert C. Riesinger
BY Hastings W. Baker
ATTORNEY Patented July 2, 1935

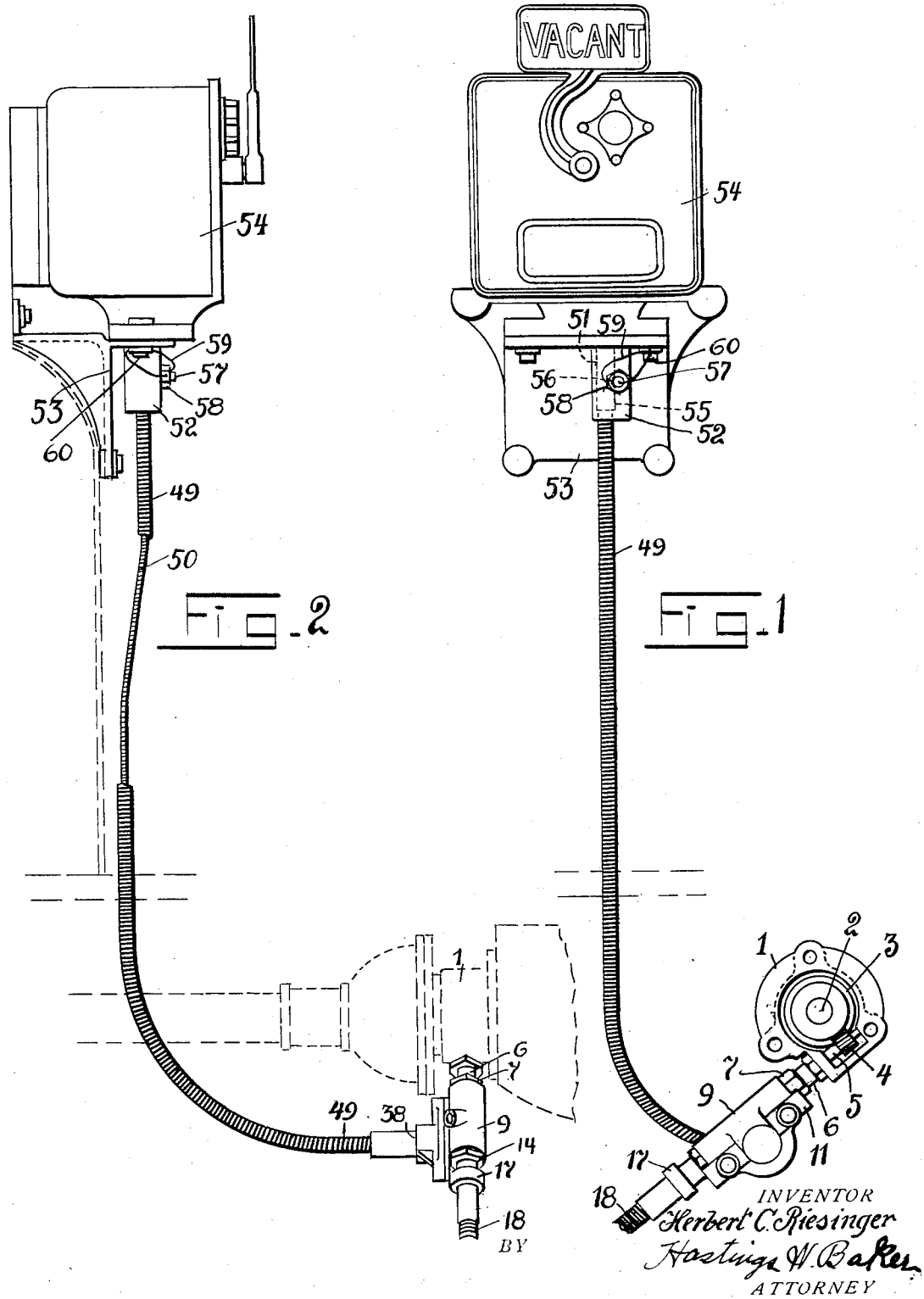

2,006,653

UNITED STATES PATENT OFFICE 2,006,653

TAMPERPROOF TRANSMISSION EQUIPMENT

Herbert C. Riesinger, Dayton, Ohio, assignor, by mesne assignments, to Central United National Bank, Cleveland, Ohio, as trustee Application September 8, 1931, Serial No. 561,616

6 Claims. (Cl. 74—606)

Heretofore there has been considerable trouble with dishonest drivers of taxicabs in particular by reason of the fact that the driver disconnects the driving equipment from the taximeter so that the taximeter will not be operated. The object of this invention is to provide means whereby it is virtually impossible for him to thus defraud his employer.

Various means have heretofore been used to try to put a stop to this evil, which means included putting a seal connecting one or more of the parts at the transmission outlet, but these seals have been beneath the floor board of the car and if they were broken they would not be easy to detect. In fact, the only way that it could be detected would be for a person to crawl beneath the car and examine the seal. One of the objects of this invention is to eliminate any seal so positioned that it cannot readily be seen.

While I have referred in particular to taximeters, my equipment is designed to be used in connection with speedometers, odometers, and other devices which would be driven by a moving part of the vehicle.

Referring to the drawings:

Figure 1 is a rear view of a taximeter showing my improved tamper-proof driving equipment attached thereto.

Figure 2 is a side elevational view thereof.

Figure 3 is an elevational view of the gear box but rotated 180 degrees from the position shown in Figure 2. Certain of the parts are broken away so as to show the internal mechanism.

Figure 4 is an end elevational view of the gear box.

Figure 5 is a side elevational view of the gear box partly in cross section and looked at from the same direction as shown in Figure 1.

Figure 6 is a cross sectional view of the gear box taken on the line 6—6 of Figure 3 but showing the drive pinion and driven shaft not in cross section.

Figure 7 is a cross sectional view on the line 7—7 of Figure 5 but showing the locking means not in cross section.

A large percentage of automobiles manufactured today are provided with a transmission outlet in the transmission housing 1 of the automobile. In the transmission housing there is a transmission shaft 2 provided with a worm 3 which is, of course, rotated corresponding to the movement of the vehicle. The worm 3 meshes with and drives a worm gear 4 mounted on a spindle 5 journaled in the transmission housing 1. The spindle 5 passes through a male nut 6.

This structure forms a part of the automobile and it is necessary for the taximeter, the speedometer, or other mileage instrument to be driven from the spindle 5.

I have provided a hexagonal nut 7 with female threads 8 adapted to be tightly screwed onto the nut 6. The gear box casing 9 may now be slipped over the reduced portion 10 of the nut 7. The casing 9 is provided with a lug 11 having an inner surface 12 which exactly fits the hexagonal part of the nut 7 so that after the casing is slipped onto the nut 7, the casing cannot be rotated without rotating the nut 7.

The reduced portion 10 of the nut 7 forms a bearing 13. A nut 14 is adapted to be slid into the other end of the casing 9 remote from the nut 7, which nut is also hexagonal and is held against rotation by a lug 15 which is exactly similar to the lug 11 and prevents the said nut 14 from being rotated. The nut 14 is provided with male threads 16 which receive a coupling 17 connected to a housing 18 which leads to the speedometer. The nut 14 is provided with a bearing 19. A shaft 20 is mounted in the bearings 13 and 19, which shaft is connected to the spindle 5 which is driven by the transmission shaft by means of a tongue 21 carried by the said shaft which fits into a groove, not shown, in the spindle 5. The shaft 20 is provided with flanges 22 and 23 which bear against the inner ends of the nuts 10 and 14 and act as antithrust bearings. The shaft 20 is also provided with a driving worm 24.

The nuts 7 and 14 are provided with circumferential arcuate channels 25 and 26. The casing 9 is provided with bores 27 having an enlarged part 28. A screw 29 extends through the bore 27 and into the bore 28 and a nut 30 receives said screw, which nut 30 is provided with a beveled part 31 which fits into the channel 25 or 26, thereby locking the nuts 7 or 14 into the housing 9 and the nut 30 is held against rotation by means of the beveled surface 31 engaging the side walls of the channels 25 or 26. It is, therefore, impossible to rotate the nut 30 and it is likewise impossible to remove the nuts 14 or 7 from the casing 9 until the screws 29 have been removed.

The housing 9 is provided with a circular opening 32 which receives a bearing 33 in which is journaled a driven shaft 34. The bearing 33 is provided with laterally extending arms 35 and 36 which are provided with bores 37 through which the screws 29 extend so that the said screws hold the bearing 33 in place. A cap 38 fits onto the circular flange 39 of the bearing 33 and is held against rotation relative to the said bearing by means of a flat surface 40 forming a part of the cap 38 which rests against a flat surface 4 of the flange 39 which is carried by the bearing 33. The cap 38 is provided with arms 42 and 43 which are provided with recesses 44. The heads 45 of the screws 29 extend upwardly into the said recesses. It is impossible to rotate the cap 38 relative to the bearing 33 for the flat surfaces 40 and 41 prevent this and the screw heads 45 extending within the recesses 44 likewise prevent it. It is, therefore, obvious that it is utterly impossible for a dishonest driver to have access to the screw 29 unless the cap 38 has been removed.

The operator cannot remove the cap 38 for the flange 39 is provided with female threads 46 into which are screwed the male threads 47 carried by a connection 48 secured to a housing 49 in which is housed a flexible shaft 50 which is connected to the driven shaft 34. The upper end of the housing 49 extends within an opening 51 in a downwardly projecting portion 52 of a meter bracket 53 on which the taximeter 54 is mounted. The upper end of the shaft housing 49 is secured to a connection 55 provided with a straight channel 56 which receives a bolt 57 which passes through the projection 52. This bolt serves a double function of preventing the housing 49 from being pulled downwardly out of the projection 52 and also the purpose of preventing the shaft housing 49 from being rotated so as to unscrew the connection 48 from the bearing 33. The bolt 57 is provided with a hexagonal bolt head 58 and a seal 59 passes through this bolt head and a bolt 60 carried by the meter bracket. It is, therefore, impossible to unscrew this bolt so as to release the shaft housing 49 without breaking the seal 59 and if the seal 59 is broken, it will be obvious to everyone around the cab that it has been broken for it is in plain view. The driven shaft 34 is provided with a worm gear 61. It will be remembered that the driven shaft 34 is also connected with the flexible shaft 50 and the upper end of this flexible shaft is connected with the driving mechanism of the meter as is well known in the art and forms no part of this invention.

The taximeter is, therefore, driven by the rotation of the transmission shaft 2 which drives the worm gear 4, spindle 5, shaft 20, driving worm 24, worm gear 61, driven shaft 34 and flexible shaft 50 which drives the taximeter.

It will be remembered that the transmission of the automobile is underneath the floor board and if the gear 7 is first connected to the housing 9 and if it were necessary to then rotate the housing in order to screw the nut 7 onto the male nut 6, we would frequently find that this is impossible on account of interfering mechanism underneath the car. The same thing would be true if we would first screw the nut 7 onto the nut 6 and then had to screw the housing 9 onto the nut 7. In order to screw it on, it would be necessary to rotate the housing 9 which, as above mentioned, is frequently impossible on account of interfering mechanism. Particular attention is, therefore, called to the fact that it is not necessary to rotate the housing 9 at all. The nut 7 is first screwed on the nut 6 and the housing 9 is then slid onto the nut 7. Attention is further called to the fact that after this has been done, it is impossible to rotate the housing 9 relative to the nut 7 on account of the lugs 11 and the shape of the nut 7, as is clearly shown in Figure 4.

Let us consider the difficulty that the driver would have in disconnecting any of the mechanism in connection with the transmission or the parts driven thereby. He cannot unscrew the nut 7 from the nut 6 unless he rotates the housing 9 and this is prevented by the shaft housing 49. He cannot disconnect the nut 7 from the housing 9 on account of the lug 11. On the other hand, he cannot take out the shaft 20 unless he can get the nut 7 or 14 off and if he would succeed in getting one of the nuts off, if he attempts to move the shaft 20 longitudinally so as to remove it, the worm gear 61 would be rotated by the longitudinal movement of the shaft 20 and it would engage either the flange 22 or the flange 23, which is wider than the space between the teeth of the gear 61, which would prevent the shaft 20 from being moved longitudinally out of its housing. His next attempt might be to rotate the nut 30. If he could do this, he could remove the entire housing 9 from the bearing 33 which would allow him to move the worm gear 61 out of mesh with the driving worm 24. He cannot, however, rotate the nut 30 on account of the beveled surface 31 thereof. His last hope would be to get at the screw 29 and rotate it but he cannot get at this screw for it is housed within the casing 9, bearing 33 and cap 38. He cannot remove the cap 39 because it is held in place by the shoulder 62 of the connection 48. If he could remove this shoulder from engagement with the cap 38 he could reach the screw head 45 but this could only be done by unscrewing the connection 48 from the flange 39 of the bearing 33. He can do this provided he can rotate the flexible shaft 49. The upper end of this shaft is locked against rotation by means of the bolt 57 and it is well known that these flexible shafts, while they will bend sidewise very easily, are virtually impossible to twist to any considerable degree so that it would be virtually impossible to unscrew the connection 48 from the flange 39. Of course, if he can remove the bolt 57, he could release the upper end but in order to do this he would have to break the seal 59 and, as above mentioned, if he would do this, it would be detected at once for it is in plain view.

I realize that various changes may be made in the specific form of the invention as shown and described herein and I, therefore, wish to reserve the right to make such changes as may fairly fall within the scope of the appended claims.

Having now described my invention, I claim:

1. In combination with a transmission and an outlet therefor, a gear box, means whereby said gear box is secured to said outlet, a shaft in said gear box operatively connected to said transmission, a second shaft housed in said gear box, means normally connecting said shafts so that said second shaft will be driven by the rotation of said first mentioned shaft, and means cooperating with said gear box to prevent the removal of the first mentioned shaft from the gear box as long as the second shaft is in its normal position.

2. In combination, a gear box, a bearing operatively connected with said gear box, arms forming a part of said bearing, a shaft mounted in said bearing, a worm gear secured to said shaft, a driving shaft, a worm thereon meshing with said worm gear, means passing through said arms to prevent said worm gear being disconnected from its driven engagement with said worm while said bearing is in its normal position, and means associated with said first-mentioned means to prevent said bearing from being thus removed.

3. In combination, a gear box, a bearing adapted to be slid into operative relation with said gear box, arms forming a part of said bearing, a shaft housing mounted in said bearing, and means passing through said arms to prevent said shaft housing and bearing from being removed from said gear box.

4. In combination, a gear box, a shaft mounted therein, a bearing for said shaft which bearing is provided with a channel, a closure member for said gear box, said closure member and gear box being provided with bolt holes having an enlarged portion in said gear box, a nut adapted to be slid into said enlarged portion so as to be seated partly within said channel so as to prevent said bearing for said shaft from being moved lengthwise, a bolt adapted to be passed through the bolt holes in the closure member and the gear box, threads carried by said bolt adapted to be screwed within said nut, and means to render inaccessible the headed end of said bolt.

5. In combination, a gear box, a shaft mounted therein, a bearing for said shaft which bearing is provided with a channel, a closure member for said gear box, said closure member and gear box being provided with bolt holes having an enlarged portion in the gear box, a nut adapted to be slid into said enlarged portion so as to be seated partly within said channel so as to prevent said bearing for said shaft from being moved lengthwise, a bolt adapted to be passed through the bolt holes in the closure member and the gear box, threads carried by said bolt adapted to be screwed within said nut, a cap for said closure member, and means forming a part of said cap to render inaccessible the headed end of said bolt.

6. In combination, a gear box, a shaft mounted therein, a bearing for said shaft and provided with a channel, a closure member for said gear box, said closure member and gear box being provided with bolt holes having an enlarged portion in the gear box, a nut adapted to be slid into said enlarged portion so as to be seated partly within said channel so as to prevent said bearing for said shaft from being moved lengthwise, a bolt adapted to be passed through the bolt holes in the closure member and the gear box, threads carried by said bolt adapted to be screwed within said nut, a cap for said closure member, means forming a part of said cap to render inaccessible the headed end of said bolt, and means to prevent relative rotation between said cap and closure member.

HERBERT C. RIESINGER.